(12) United States Patent
Onoda et al.

(10) Patent No.: US 9,969,914 B2
(45) Date of Patent: May 15, 2018

(54) MICROCAPSULE TYPE CURABLE RESIN COMPOSITION

(71) Applicant: THREEBOND FINE CHEMICAL CO., LTD, Sagamihara-Shi, Kanagawa (JP)

(72) Inventors: Tomohiro Onoda, Tokyo (JP); Kunihiko Kamata, Tokyo (JP); Yasuo Maeda, Tokyo (JP)

(73) Assignee: THREEBOND FINE CHEMICAL CO., LTD., Kanagawa (JP)

( * ) Notice: Subject to any disclaimer, the term of this patent is extended or adjusted under 35 U.S.C. 154(b) by 270 days.

(21) Appl. No.: 15/023,524

(22) PCT Filed: Sep. 8, 2014

(86) PCT No.: PCT/JP2014/073651
§ 371 (c)(1),
(2) Date: Mar. 21, 2016

(87) PCT Pub. No.: WO2015/045830
PCT Pub. Date: Apr. 2, 2015

(65) Prior Publication Data
US 2016/0208150 A1 Jul. 21, 2016

(30) Foreign Application Priority Data

Sep. 25, 2013 (JP) ................... 2013-198047

(51) Int. Cl.
| | | |
|---|---|---|
| C08G 59/00 | (2006.01) | |
| C09J 163/00 | (2006.01) | |
| C08F 2/00 | (2006.01) | |
| C08F 2/44 | (2006.01) | |
| C09J 133/14 | (2006.01) | |
| C08G 59/18 | (2006.01) | |
| C08G 59/24 | (2006.01) | |
| C08G 59/50 | (2006.01) | |
| C08L 63/00 | (2006.01) | |
| C08F 2/20 | (2006.01) | |
| C09J 4/06 | (2006.01) | |
| F16B 39/22 | (2006.01) | |
| C08K 3/34 | (2006.01) | |
| C08K 3/36 | (2006.01) | |

(52) U.S. Cl.
CPC ............. C09J 163/00 (2013.01); C08F 2/00 (2013.01); C08F 2/20 (2013.01); C08F 2/44 (2013.01); C08G 59/188 (2013.01); C08G 59/245 (2013.01); C08G 59/50 (2013.01); C08L 63/00 (2013.01); C09J 4/06 (2013.01); C09J 133/14 (2013.01); F16B 39/225 (2013.01); C08K 3/34 (2013.01); C08K 3/346 (2013.01); C08K 3/36 (2013.01); C08K 2201/003 (2013.01); C08K 2201/014 (2013.01)

(58) Field of Classification Search
CPC . C08G 59/188; C08K 3/34; C08K 3/36; C09J 4/06
See application file for complete search history.

(56) References Cited

U.S. PATENT DOCUMENTS 4,237,252 A * 12/1980 Newell ................ C08G 18/003
521/76
4,293,677 A * 10/1981 Imai ....................... C08L 83/04
528/15

FOREIGN PATENT DOCUMENTS

| JP | 64-1780 A | 1/1989 |
|---|---|---|
| JP | 1-108284 A | 4/1989 |
| JP | 3-292378 A | 12/1991 |
| JP | 7-42719 A | 2/1995 |
| JP | 9-249872 A | 9/1997 |
| JP | 10-130587 A | 5/1998 |
| JP | 10-252177 A | 9/1998 |
| JP | 11-50013 A | 2/1999 |
| JP | 11-349917 A | 12/1999 |
| JP | H11349917 * | 12/1999 |
| JP | 2000-191745 A | 7/2000 |
| JP | 2000-239438 A | 9/2000 |
| JP | 2002-212513 A | 7/2002 |
| JP | 2008-056891 * | 3/2008 |
| JP | 2008-56891 A | 3/2008 |
| JP | 2010-205498 A | 9/2010 |
| JP | 4715517 * | 7/2011 |
| JP | 2012-10908 A | 1/2012 |
| WO | 2005/054393 A1 | 6/2005 |

OTHER PUBLICATIONS

International Search Report dated Dec. 9, 2014, issued in counterpart International Application No. PCT/JP2014/073651(2 pages).

* cited by examiner

Primary Examiner — Kara B Boyle
(74) Attorney, Agent, or Firm — Westerman, Hattori, Daniels & Adrian, LLP

(57) ABSTRACT

A microcapsule type curable resin composition produces substantially no gases when applied to an adherend, e.g., to a threaded member, which is then tightened, moreover, due to exceptional coating properties to an adherend, does not give rise to coating irregularities. The microcapsule type curable resin composition contains (A) microcapsules encapsulating a curable compound (a), (B) a substance able to bring about curing of component (a), and (C) a binder able to adhere the microcapsules to an adherend, wherein the microcapsule type curable resin composition includes, per total 100 mass parts, (D) 1-25 mass parts of mica having average particle diameter of 10-150 μm, and (E) 1-25 mass parts of an inorganic filler having average particle diameter of 3-50 μm, the mass ratio of component (D) and component (E) being 0.2-2.0 of component (E) with respect to 1.0 of component (D).

9 Claims, 1 Drawing Sheet

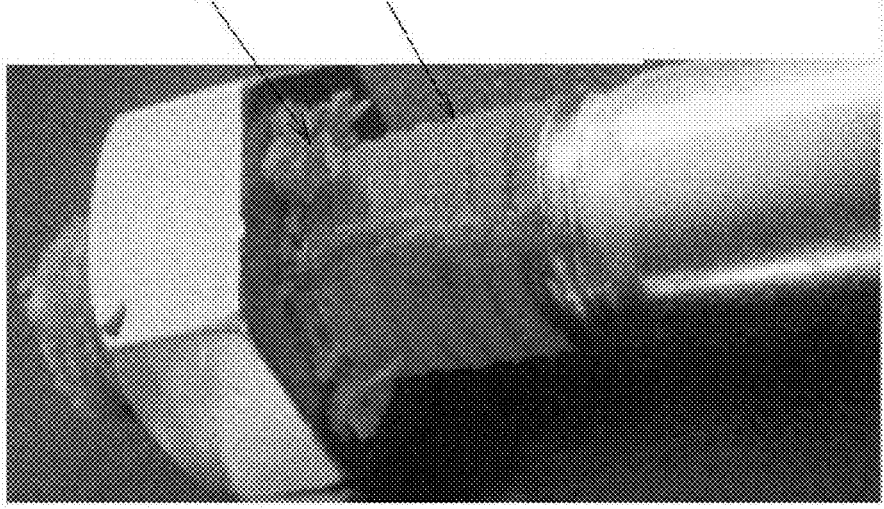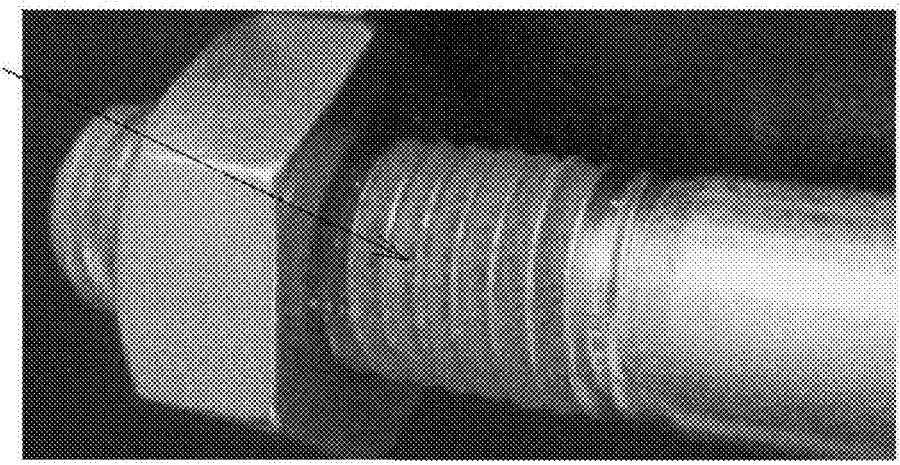

MICROCAPSULE TYPE CURABLE RESIN COMPOSITION

TECHNICAL FIELD

The present invention relates to a microcapsule type curable resin composition, and more particularly relates to a microcapsule type curable resin composition, for example, used for bonding, locking etc. a threaded member (a screw-type fastening fixture) such as screw.

BACKGROUND ART

Conventionally, a microcapsule type adhesive for adhering a threaded member such as screw, bolt, nut, and machine screw is well known. Furthermore, it is known that an inorganic filler such as silica, alumina, and calcium carbonate is blended with the microcapsule type adhesive for purposes of efficiently breaking the microcapsule, controlling fluidity of the adhesive, enhancing viscosity of the adhesive and the like. For example, a fastener in which a film of an adhesive composition comprising a monomer with (meth)acryloyl group emulsified into water by a polymer with film-forming ability, an encapsulated organic peroxide with an amino resin as a wall film, and a reducing agent which forms redox with the organic peroxide is formed on a screw portion is known, and the fastener is characterized in that the film is formed by repeatedly applying and drying the adhesive composition several times (Patent Document 1). It is described that, in the adhesive composition, fine powder of silica, alumina or calcium carbonate, potassium titanate fibers, and a glassy or ceramic microballoon may be added as a torque adjusting agent in the amount of 30 weight parts or less with respect to 100 weight parts of the monomer with (meth)acryloyl group. In the example, borosilicate glass with a particle diameter of 40 to 50 μm is used. Furthermore, a method for manufacturing an adhesive is known, the method being characterized in that a mixture comprising predetermined amounts of a monomer with (meth)acryloyl group emulsified into water by a polymer with film-forming ability, an encapsulated organic peroxide, and a reducing agent which forms a redox system with the organic peroxide is agitated in the substantial absence of oxygen (Patent Document 2). It is described that, in the adhesive, talc, silica, alumina or calcium carbonate may be used for imparting a thixotropic property. Furthermore, it is disclosed that, in a method for sealing two abutting metal surfaces, a sealing composition in which at least one of: (a) a polymerizable liquid monomer selected from (meth)acrylate ester monomers; (b) a primary initiator of free-radical polymerization; and (c) a combination of an accelerator/a secondary polymerization initiator are microcapsuled, is used (Patent Document 3). In the example, it is described that silica is used as a thickener.

Besides the inventions described above, inventions in which an inorganic filler such as silica is blended with a microcapsule type adhesive are known. For example, a curable composition obtained by mixing and heating a blend comprising as main components (a) a microcapsule containing one or more kind of organic peroxides as an encapsulated substance, (b) one or more kind of compounds with at least one of polymerizable double bonds on an end or a side chain in the molecule, (c) one or more kind of accelerators which form a redox system with the organic peroxide, and (d) a plastisol, is disclosed (Patent Document 4). In the invention, (d) the plastisol is blended to make the curable composition into a viscoelastic fluid state. The component (a) includes peroxides, hydroperoxides, peresters and peramides, the component (b) includes a compound with (meth)acryloyl group on an end or a side chain in the molecule, and the component (c) includes a conventionally known substance such as amines and sulfimides. Furthermore, it is described that spherical, preferably perfectly spherical, silica powder with a particle diameter of 0.1 to 10 μm may be blended with the curable composition as a non-slipping agent for improving a coefficient of friction. Moreover, a precoat-type adhesive composition for a screw member or the like containing (A) a suspension solution obtained by mixing (1) one or more kind of polymerization accelerators, (2) one or more kind of compounds with at least one of polymerizable double bonds on an end or a side chain in the molecule, (3) one or more kind of acidic substances which exhibit acidity after dissolution into water, and (4) an aqueous binder with emulsifying ability which is water-insolubilized by (3) the acidic substance, and (B) a microcapsule encapsulating one or more kind of polymerization initiators, is disclosed (Patent Document 5). In the invention, it is described that stability of suspension particles is enhanced by further adding a colloidal silica solution to the above suspension solution. Moreover, an aerosol-type spraying adhesive composition which is precoated for locking a screw-type fastening fixture is disclosed, the adhesive composition containing a suspension obtained by suspending a microcapsule in which a resin based adhesive is encapsulated and a fine particulate inorganic filler into a solution prepared by dissolving a curing agent and/or a curing catalyst and a resin based binder into a volatile organic solvent, and a propellant, or the adhesive composition containing a suspension obtained by suspending a microcapsule in which a curing agent and/or a curing catalyst are encapsulated and a fine particulate inorganic filler into a solution prepared by dissolving a resin based adhesive and a resin based binder into a volatile organic solvent, and a propellant, each characterized by being applied in an atomized aerosol spray state (Patent Document 6). In the invention, by adjusting a particle diameter of the microcapsule, a particle diameter of the filler, and viscosity of the adhesive liquid, the adhesive liquid is kept in a stable suspended state even after long term preservation and an adhesive composition which can be sprayed from an aerosol container is obtained. It is described that, as the fine particulate inorganic filler, silica, calcium carbonate, calcium silicate, kaolin, alumina, talc or the like is suitable and the fine particulate inorganic filler has action for increasing the amount and enhancing mechanical strength. Moreover, a microcapsule type adhesive composition containing (A) a microcapsule comprising epoxy resin as a core material and aldehyde-based resin or urea resin as a wall material, (B) an emulsion comprising binder resin with emulsifying ability, (C) a water-soluble or water-dispersible amine-based curing agent, and (D) a hydrolyzed and neutralized product of a copolymer obtained from alkyl vinyl ether and maleic anhydride, or a hydrolyzed and neutralized product of cross-linked alkyldiene of the copolymer obtained from alkyl vinyl ether and maleic anhydride, is disclosed (Patent Document 7). The invention provides an adhesive composition with excellent preservability, no liquid dripping when applied, and no generating uneven thickness when dried. It is described that the adhesive composition can further contain silica, alumina, talc, calcium carbonate, mica, kaolin or the like as a filler.

Although, as described above, various adhesive compositions in which an inorganic filler such as silica is blended with a microcapsule type adhesive are known, there is a problem that, if the compositions are used for precoating a screw portion such as bolt and nut, a shaving of a dried film of the compositions is produced from the screw portion when screwed and the shaving is scattered and stuck to a peripheral portion. When the compositions are used for electronic components, the scattering of the shaving causes failure in operation of a sliding part in the components and of machines such as precision components, generation of noise, and failure in energization in a switch or the like. Therefore, a method for preventing the scattering of the shaving has been studied. For example, a polymerizable sealing composition containing polymerizable poly(meth)acrylate, a polymerization initiator, a polymerization catalyst, a binder composed of a (meth)acrylate ester polymer, and a filler is disclosed, the composition being characterized in that the polymerizable poly(meth)acrylate is encapsulated in a microcapsule with the polymerization initiator, or the polymerization catalyst (Patent Document 8). The polymerizable sealing composition is used for coating a screwing portion of a fastener with threads such as bolt and nut, and the use of the polymerizable sealing composition can prevent a shaving of a dried film of the composition from being produced from a screw portion in a shaving state when screwed. The filler is used for purposes of improving heat resistance and promoting breakage of the microcapsule when the polymerizable sealing composition is applied to a screwing portion of a screw or the like. It is described that the filler includes, for example, an inorganic filler such as silica powder, calcium carbonate, talc, diatomaceous earth and clay, and that the inorganic filler is used in the amount of 10 to 30 weight parts per 100 weight parts of the microcapsule.

PRIOR ART DOCUMENTS

Patent Documents

[Patent Document 1] JP-Hei-07-042719 A
[Patent Document 2] JP-Sho-64-001780 A
[Patent Document 3] JP-Hei-09-249872 A
[Patent Document 4] JP-Hei-11-050013 A
[Patent Document 5] JP-Hei-10-130587 A
[Patent Document 6] JP-Hei-11-349917 A
[Patent Document 7] WO 2005/054393
[Patent Document 8] JP-Hei-01-108284 A

SUMMARY OF INVENTION

Technical Problem

The present invention provides a microcapsule type curable resin composition with excellent adhesive strength and durability characterized in that a shaving is hardly generated when the composition is applied to an adherend, for example a threaded member, for fastening, and in that uneven application is not generated due to an excellent applying property of the composition to the adherend.

Solution to Problem

The polymerizable sealing composition proposed by the applicant as described in the Patent Document 8 can prevent generation of a shaving when applied to a threaded member for fastening. The polymerizable sealing composition as described in the Patent Document 8 achieves the above effect by setting a viscosity of poly(meth)acrylate encapsulated in the microcapsule to 100 cps or less. In order to lower the viscosity of the poly(meth)acrylate as described above, a diluent monomer or a plasticizer must be used, so there is a problem that adhesive strength (fixing force) of an obtained coated film is reduced.

Therefore, the inventors further studied in order to solve the problem. As described in the above Patent Documents, it has been conventionally known that an inorganic filler such as silica, alumina and calcium carbonate is blended for the purpose of efficiently breaking a microcapsule. However, even if any inorganic filler is blended, breakage of a microcapsule can be promoted, but there is a problem that a shaving is generated when the composition is applied to a threaded member for fastening. Therefore, as a result of repeated studies, the inventors found that generation of a shaving can be prevented without lowering adhesive strength and applying property of a obtained microcapsule type curable resin composition when the composition is applied to a threaded member for fastening, by: selecting a mica particle from the various kinds of inorganic fillers which have conventionally caused the problem of producing a shaving; combining the particle with an inorganic filler particle such as diatomaceous earth, talc and silica; further controlling average particle diameters of these particles to the following predetermined values, and, in addition; and setting the blending amount and blending ratio of these particles within the following predetermined ranges, thereby the present invention was led to completion.

That is, the present invention is (1) a microcapsule type curable resin composition containing (A) a microcapsule encapsulating a curable compound (a); (B) a substance able to bring about curing of the component (a); and (C) a binder able to adhere the microcapsule to an adherend, characterized in that the microcapsule type curable resin composition includes, per total 100 parts by mass of all of the microcapsules, (D) 1 to 25 parts by mass of mica having an average particle diameter of 10 to 150 µm, and (E) 1 to 25 parts by mass of an inorganic filler (except the mica) having an average particle diameter of 3 to 50 µm, the mass ratio of the component (D) and the component (E) being 0.2 to 2.0 of the component (E) with respect to 1.0 of the component (D).

A preferable aspect can include (2) the microcapsule type curable resin composition according to (1), wherein the component (E) is selected from the group consisting of diatomaceous earth, talc, silica, alumina, clay, calcium carbonate, calcium silicate and kaolin;

(3) the microcapsule type curable resin composition according to (1), wherein the component (E) is selected from the group consisting of diatomaceous earth, talc and silica;

(4) the microcapsule type curable resin composition according to any one of (1) to (3), wherein an average particle diameter of the component (A) is 50 to 500 µm;

(5) the microcapsule type curable resin composition according to any one of (1) to (3), wherein an average particle diameter of the component (A) is 100 to 300 µm;

(6) the microcapsule type curable resin composition according to any one of (1) to (5), wherein the average particle diameter of the component (D) is 50 to 150 µm;

(7) the microcapsule type curable resin composition according to any one of (1) to (5), wherein the average particle diameter of the component (D) is 100 to 150 µm;

(8) the microcapsule type curable resin composition according to any one of (1) to (7), wherein the component (D) is in a flake state;

(9) the microcapsule type curable resin composition according to any one of (1) to (8), wherein the average particle diameter of the component (E) is 5 to 30 µm;

(10) the microcapsule type curable resin composition according to any one of (1) to (8), wherein the average particle diameter of the component (E) is 5 to 25 µm;

(11) the microcapsule type curable resin composition according to any one of (1) to (10), wherein the component (E) has an indeterminate form;

(12) the microcapsule type curable resin composition according to any one of (1) to (11), wherein the component (D) is in the amount of 5 to 20 parts by mass per 100 parts by mass of the component (A);

(13) the microcapsule type curable resin composition according to any one of (1) to (11), wherein the component (E) is in the amount of 5 to 15 parts by mass per 100 parts by mass of the component (A);

(14) the microcapsule type curable resin composition according to any one of (1) to (13), wherein the mass ratio of the component (D) and the component (E) is 0.25 to 1.75 of the component (E) with respect to 1.0 of the component (D);

(15) the microcapsule type curable resin composition according to any one of (1) to (13), wherein the mass ratio of the component (D) and the component (E) is 0.3 to 1.5 of the component (E) with respect to 1.0 of the component (D);

(16) the microcapsule type curable resin composition according to any one of (1) to (15), wherein the component (a) is one or more kinds selected from the group consisting of a (meth)acrylate compound and an epoxy compound;

(17) the microcapsule type curable resin composition according to any one of (1) to (16), wherein the component (B) is encapsulated in a microcapsule separate from that containing the component (a);

(18) the microcapsule type curable resin composition according to any one of (1) to (17), wherein the component (B) is a peroxide;

(19) the microcapsule type curable resin composition according to any one of (1) to (18), wherein the component (C) is a (meth)acrylate ester (co)polymer emulsion;

(20) the microcapsule type curable resin composition according to any one of (1) to (19), wherein the adherend is a threaded member.

Advantageous Effects of Invention

When the microcapsule type curable resin composition according to the present invention is applied to an adherend, for example a threaded member, for fastening, a shaving is hardly generated. Moreover, since uneven application is not generated due to the excellent applying property of the composition to the adherend, a uniform coated film is easily formed, and furthermore, when the composition is applied to the adherend, for example the threaded member, for fastening, it can be easily tightened with uniform force and stable adhesive force without unevenness can be obtained. In addition, not only excellent adhesive strength but excellent durability of the adhesive strength is also obtained.

BRIEF DESCRIPTION OF DRAWINGS

FIG. 1 shows the difference in a generation degree of a shaving when two kinds of microcapsule type curable resin compositions are applied to a threaded member (Example 4 and Comparative Example 8).

DESCRIPTION OF EMBODIMENTS

The microcapsule type curable resin composition according to the present invention contains (A) a microcapsule encapsulating a curable compound (a); (B) a substance able to bring about curing of the component (a); and (C) a binder able to adhere the microcapsule to an adherend, and is characterized by further containing (D) mica with a predetermined average particle diameter and (E) an inorganic filler with a predetermined average particle diameter in the predetermined amount and predetermined ratio.

An upper limit of the average particle diameter of the component (D) the mica is 150 µm, preferably 140 µm, and a lower limit thereof is 10 µm, preferably 50 µm, more preferably 100 µm. If the average particle diameter is less than the above lower limit, the microcapsule may not be broken well, whereas, if the average particle diameter is more than the above upper limit, a applying property to the adherend of the microcapsule type curable resin composition gets worse so that they are not preferred. The average particle diameter is D50 (cumulative 50% diameter) measured by a laser diffraction method, and, for example, as D50, a value measured with a particle size distribution measuring device LS100Q made by Beckman Coulter, Inc. can be used. The component (C) the mica is preferably in a flake state.

An upper limit of the average particle diameter of the component (E) the inorganic filler is 50 µm, preferably 30 µm, more preferably 25 µm and a lower limit thereof is 3 µm, preferably 5 µm. If the average particle diameter is less than the above lower limit, the shaving generation amount is increased and the applying property to the adherend of the microcapsule type curable resin composition gets worse. Whereas, if the average particle diameter is more than the above upper limit, the applying property to the adherend of the microcapsule type curable resin composition gets worse so that it is not preferred. The average particle diameter is measured by the laser diffraction method as described above. The component (E) the inorganic filler is not particularly limited except the mica as far as the component (E) has the above average particle diameter. Preferably the component (E) is selected from the group consisting of diatomaceous earth, talc, silica, alumina, clay, calcium carbonate, calcium silicate and kaolin, and more preferably it is selected from the group consisting of diatomaceous earth, talc and silica. The component (E) the inorganic filler preferably has an indeterminate form.

An upper limit of the content of the component (D) the mica particle is 25 parts by mass, preferably 20 parts by mass, more preferably 17.5 parts by mass, further preferably 16 parts by mass, and a lower limit thereof is 1 parts by mass, preferably 5 parts by mass, more preferably 7 parts by mass, further preferably 7.5 parts by mass, per total 100 parts by mass of all of the microcapsules contained in the microcapsule type curable resin composition. If the content is more than the above upper limit, the shaving generation amount is increased, whereas if the content is less than the above lower limit, not only the shaving generation amount is increased, but the microcapsule may not be broken well and furthermore the applying property to the adherend of the microcapsule type curable resin composition gets worse. An upper limit of the content of the component (E) the inorganic filler is 25 parts by mass, preferably 20 parts by mass, more preferably 17.5 parts by mass, further preferably 15 parts by mass, and a lower limit thereof is 1 parts by mass, preferably 5 parts by mass, more preferably 7.5 parts by mass, per total 100 parts by mass of all of the microcapsules contained in the microcapsule type curable resin composition. If the content is more than the above upper limit, the shaving generation amount is increased, whereas if the content is less than the above lower limit, not only the shaving generation amount is increased, but the microcapsule may not be broken well and furthermore the applying property to the adherend of the microcapsule type curable resin composition gets worse. The microcapsule contained in the microcapsule type curable resin composition is not limited to the microcapsule (A) encapsulating the curable compound (a) and includes a microcapsule when the substance (B) able to bring about curing of the component (a) is microcapsuled.

For the mass ratio of the component (D) the mica and the component (E) the inorganic filler, a lower limit of the component (E) is 0.2, preferably 0.25, more preferably 0.3, and an upper limit thereof is 2.0, preferably 1.75, more preferably 1.5, with respect to 1.0 of the component (D). If the component (E) is less than the above lower limit, the microcapsule may not be broken well, whereas if the component (E) is more than the above upper limit, the shaving generation amount is increased.

As the curable compound (a) contained in the microcapsule (A), an acrylic or methacrylic functional compound (which may be collectively referred to a (meth)acrylate compound in the present specification and the claims), or an epoxy functional compound (which may be referred to an epoxy compound in the present specification and the claims) is preferably used. The (meth)acrylate compound includes, for example, mono(meth)acrylate such as methyl (meth)acrylate, ethyl (meth)acrylate, propyl (meth)acrylate, n-butyl (meth)acrylate, 2-ethylhexyl (meth)acrylate, cyclohexyl (meth)acrylate, isobutyl (meth)acrylate, 2-hydroxyethyl (meth)acrylate, 2-hydroxypropyl (meth)acrylate, methoxyethyl (meth)acrylate, n-butoxyethyl (meth)acrylate, allyl (meth)acrylate, 3-chloro-2-hydroxyethyl (meth)acrylate, glycidyl (meth)acrylate, 2-cyanoethyl (meth)acrylate, dimethylaminoethyl (meth)acrylate, diethylaminoethyl (meth)acrylate, 2-chloroethyl (meth)acrylate, 2-bromoethyl (meth)acrylate, tetrahydrofurfuryl (meth)acrylate, acetoxyethyl (meth)acrylate, phenoxyethyl (meth)acrylate, methoxyethoxyethyl (meth)acrylate, lauryl (meth)acrylate, benzyl (meth)acrylate and phthalic acid (meth)acryloyloxyethyl ester, poly(meth)acrylate of polyol such as ethylene glycol, 1,2-propylene glycol, 1,3-butanediol, 1,4-butanediol, diethylene glycol, triethylene glycol, 1,6-hexanediol, neopentyl glycol, trimethylolethane, trimethylolpropane, glycerin, pentaerythritol, 1,2,6-hexantriol and hydrogenated bisphenol A; polyester poly(meth)acrylate obtained by dehydration-condensation esterification reaction with the above polyol and polybasic acid or acid anhydride thereof and (meth)acrylic acid as starting materials; and the like, and these poly(meth)acrylates can be used alone or as a mixture obtained by combining two or more kinds. Among the above poly(meth)acrylates, a glycidyl methacrylate ester-based compound is preferable due to large adhesive force. As the epoxy compound, a water-insoluble or hardly soluble epoxy resin with an epoxy group in the molecule is used. The epoxy resin includes, for example, known epoxy resins such as bisphenol A type epoxy resin obtained by reacting bisphenol A and epichlorohydrin, bisphenol F type epoxy resin obtained by reacting bisphenol F and epichlorohydrin, and novolac type epoxy resin obtained by reacting novolac resin and epichlorohydrin.

The curable compound (a) is encapsulated in the microcapsule. Thereby, direct contact of the component (a) with the substance (B) able to bring about curing of the component (a) can be avoided and preservation stability of the microcapsule type curable resin composition can be ensured. As a substance constituting a microcapsule wall, a conventionally known substance can be used. For example, gelatin, aldehyde resin, or urea resin is used. The aldehyde resin includes, for example, urea-formaldehyde resin, melamine-formaldehyde resin and the like, and the urea resin includes, for example, polyurea resin, polyurethane resin and the like. An average particle diameter of the microcapsule can be set to a desired value by regulating agitation speed, agitation time and the like. In the present invention, the average particle diameter is preferably 50 to 500 μm, more preferably 100 to 300 μm, further preferably 120 to 200 μm. In general, it is approximately 150 μm. The average particle diameter is determined as follows. First, an arbitrarily extracted microcapsule is photographed with a scanning electron microscope to measure a particle diameter. And then, the measurement is repeated for 100 capsules to determine their average value as the average particle diameter. If the particle diameter is less than the above lower limit, shaving generation reducing action caused by the present invention is reduced, and furthermore, since total surface area of the particles is increased, each capsule wall is thinned and stability of the capsule itself is reduced, by relation with the amount of the substance constituting the microcapsule wall so that storage stability of the microcapsule type curable resin composition may get worse. Whereas if the particle diameter is more than the above upper limit, a screwing portion is hardly threaded, and strength of a capsule wall film is reduced so that uniform curing of the above resin composition may be prevented.

For the mass ratio of the component (a) and the above substance constituting the microcapsule wall, the substance constituting the microcapsule wall is preferably 0.1 to 2.0, more preferably 0.1 to 1.5, with respect to 1.0 of the component (a). In general, it is approximately 0.2 to 0.9 with respect to 1.0 of the component (a). If the substance is less than the above lower limit, the capsule wall is too thinned so that stability of the capsule is reduced and capsulation is difficult. Furthermore, storage stability of the microcapsule type curable resin composition may get worse. Whereas if the substance is more than the above upper limit, a wall material is too thickened, for example the capsule may not be sufficiently broken in being threaded so that curing may not immediately proceed.

The microcapsule (A) encapsulating the curable compound (a) can be manufactured using a known microencapsulation method, for example, interfacial polymerization method, in-situ method, insolubilization precipitation method, coacervation method, or the like. For example, it can be manufactured using a method described in JP 2000-015087 A or the like.

As the substance (B) able to bring about curing of the component (a), preferably a peroxide, more preferably an organic peroxide are used when the component (a) is a (meth)acrylate compound. The organic peroxide includes, for example, benzoyl peroxide, 2,5-dihydroperoxide, cyclohexane peroxide, t-butylperoxymaleic acid, lauroyl peroxide, dicumyl peroxide, 2,5-dimethyl-2,5-di(t-butylperoxy) hexane and the like. These organic peroxides can be used alone or with a combination of two or more kinds. Furthermore, when the component (a) is an epoxy compound, an amine-based compound, an acid anhydride, a polyphenol compound, or the like is preferably used. For example, the substance includes nonvolatile amines such as imidazole, 1,3-bis-4-piperidyl propane, 1,6-hexadiamine, methylenedianiline, substituted alkyl resin amine, liquid polyamide of dimerized unsaturated fatty acid (Versamid125) reacted with alkylenediamine; nonvolatile solid amine salt obtained by reacting volatile liquid amine and an acid; amine addition compound; water-insoluble polyamide resin; and the like. The component (B) is preferably encapsulated in a microcapsule separate from that containing the component (a). The preservation stability can be further enhanced by encapsulating the component (a) and the component (B) in the separate microcapsules, respectively. A method for manufacturing the microcapsule encapsulating the component (B), and a substance constituting a microcapsule wall, a particle diameter of the microcapsule, and mass ratio of the component (B) and the above substance constituting the microcapsule wall are similar to those of the above component (A).

A kind of the binder (C) able to adhere the microcapsule to an adherend is not particularly limited as far as the binder forms a film after drying, and may adhere the microcapsule (A), and a microcapsule when the component (B) is encapsulated in the microcapsule, to an adherend, preferably a threaded member. Furthermore, the binder can also adhere components except the above contained in the microcapsule type curable resin composition, for example, (D) the mica particle and (E) the silica particle, to the adherend. The binder includes, for example, (meth)acryl-based resin, urethane-based resin, butadiene-based resin, vinyl acetate-based resin and the like. In general, these binders are used in the form of an emulsion. A commercial product of the binder includes, for example, Newcoat KSB-1 (trademark, acryl-based; pH=8, made by Shin-Nakamura Chemical Co., Ltd.), VONCOAT DC-118 (trademark, acryl-based; pH=8, made by Dainippon Ink & Chemicals, Inc.), Lacstar DA-401 (trademark, butadiene-based; pH=8, made by Dainippon Ink & Chemicals, Inc.), VONDIC 1530 (trademark, urethane-based; pH=8, made by Dainippon Ink & Chemicals, Inc.) and the like. In the emulsion containing the (meth)acryl-based resin, a (meth)acryl-based (co)polymer obtained by emulsion polymerization, for example a (meth)acrylate ester (co)polymer, is dispersed in water. In general, in the emulsion polymerization step of the resin emulsion, an electrolyte substance is added in an aqueous medium to control a particle diameter. An acrylate ester monomer used in the emulsion polymerization step is homopolymerized with itself to form an acrylate ester homopolymer, and is copolymerized with a wide range of monomer, for example, methacrylate ester, vinyl acetate, styrene, acrylonitrile, acrylic acid, or the like to form the stable emulsion. The emulsion containing the vinyl acetate resin can be manufactured by an emulsion polymerization step in which a vinyl acetate monomer is continually added while heating and agitating an emulsifier, or protective colloid, a polymerization initiator, a neutralizer aqueous solution. The vinyl acetate monomer can be homopolymerized with itself, and can be copolymerized with various monomers, for example acrylate ester, maleate ester, fumarate ester, fatty acid vinyl ester, ethylene, or the like. There are various methods for manufacturing the emulsion containing the urethane-based resin. In a phase inversion emulsification method, the emulsion is manufactured by reacting isocyanate with a polyol component to prepare a polyurethane resin with a hydroxyl group on the end, and then by diluting the resin with a solvent such as toluene and dropping an emulsifier aqueous solution into the diluted resin before agitating to emulsify the same. In a blocked isocyanate method, the emulsion is manufactured by treating a prepolymer with an isocyanate group on the end, which is obtained by a reaction of excessive equivalent of isocyanate with a polyol component, with a blocking agent such as ketoximes and phenols to block the isocyanate group on the end, and then by dropping an emulsifier aqueous solution into the blocked prepolymer before agitating to emulsify the same. In a prepolymer method, the emulsion is manufactured by using an emulsifier to mechanically emulsify a prepolymer with an isocyanate group on the end in water, and by using a chain extender to react the emulsified prepolymer at a particle interface for polymerization. In a self emulsification method, the emulsion is manufactured by introducing a polar group into a polymer to make the polymer a self emulsification type, without using an emulsifier. pH of the emulsion prepared with the binder resin is preferably 6 to 13. If the pH is lower than 6, an emulsified and dispersed state of the binder is changed so that the binder is remarkably thickened and may not be applied to an adherend. Whereas, if the pH is more than 13, influence such as corrosion on metal components is concerned.

When the component (a) is the (meth)acrylate compound, an upper limit of the content of the above component (B) in the microcapsule type curable resin composition according to the present invention is preferably 30 parts by mass, more preferably 25 parts by mass, further preferably 20 parts by mass, and a lower limit is preferably 1 parts by mass, more preferably 3 parts by mass, further preferably 5 parts by mass, per 100 parts by mass of the component (A) the microcapsule. Furthermore, when the component (a) is the epoxy compound, an upper limit of the content of the above component (B) is preferably 80 parts by mass, more preferably 70 parts by mass, and a lower limit is preferably 40 parts by mass, more preferably 50 parts by mass, per 100 parts by mass of the component (A) the microcapsule. If the content of the component (B) is more than the above upper limit, increase of remarkable effect on curability of the component (a) is not seen, further leading to reduction of a thermal fixing property. Whereas if the content is less than the above lower limit, the component (a) may not be sufficiently cured. Furthermore, an upper limit of the content of the component (C) is preferably 50 parts by mass, more preferably 30 parts by mass, and a lower limit is preferably 5 parts by mass, more preferably 10 parts by mass, per total 100 parts by mass of all of the microcapsules. If the content is more than the above upper limit, remarkable increase of effect for adhering the microcapsule to an adherend is not seen, rather leading to a high cost, whereas if the content is less than the above lower limit, the microcapsule may not be sufficiently adhered to an adherend.

Moreover, the microcapsule type curable resin composition according to the present invention can further contain a component (F) a curing accelerator. When the component (a) is the (meth)acrylate compound, (F) the curing accelerator preferably includes saccharin, thiosalicylic acid, and the like. When the component (a) is the epoxy compound, a known curing accelerator such as a tertiary amine compound, dicyandiamide and the like can be used. An upper limit of the content of the component (F) is preferably 300 parts by mass, more preferably 250 parts by mass, and a lower limit is preferably 10 parts by mass, more preferably 20 parts by mass, per 100 parts by mass of the substance (B) able to bring about curing of the component (a).

If necessary, in addition to the above respective components, various additives can be added to the microcapsule type curable resin composition according to the present invention within a range without preventing effect of the present invention. The additive can include, for example, filler such as polyamide resin and fluororesin powder, an organic or inorganic pigment such as carbon black, titanium oxide, and a phthalocyanine compound, dye, plasticizer, surfactant, a dispersing agent, a deforming agent, an viscoelasticity adjusting agent, and the like. Furthermore, water can be also added to the microcapsule type curable resin composition containing the above respective components to set to suitable concentration.

A method for manufacturing the microcapsule type curable resin composition according to the present invention by blending the above respective components is not particularly limited but a known method can be used. For example, (D) the mica and (E) the inorganic filler, and titanium oxide as the pigment are added to ion-exchange water before agitating. Next, while agitation is continued after adding the binder (C), the microcapsule (A) encapsulating the component (a) and the component (B) are added, and then the agitation is maintained into a uniform state so that the capsule is not broken, thereby the microcapsule type curable resin composition according to the present invention can be manufactured.

Although the present invention will be described in more detail in the following Examples, the present invention is not limited to the Examples.

EXAMPLES

Substances

Each component used in the Examples and the Comparative Examples is as follows:

<Component (a): Curable Compound>

(i) Mixture of ethoxylated bisphenol A methacrylate [NK ester BPE-80N (trademark) made by Shin-Nakamura Chemical Co., Ltd.] and ethylene glycol dimethacrylate [NK ester 1G (trademark) made by Shin-Nakamura Chemical Co., Ltd.] mixed in molar ratio of 9.5:0.5

(ii) Mixture of bisphenol A type epoxy resin [jER828 (trademark) made by Mitsubishi Chemical Corporation], bisphenol F type epoxy resin [jER807 (trademark) made by Mitsubishi Chemical Corporation] and neodecanoic acid glycidyl ester [Cardura E10P (trademark) made by Momentive Specialty Chemicals Inc.] mixed in molar ratio of 4.5:4.5:1.0

<Component (B): Substance Able to Bring about Curing of the Component (a).>

(i) Benzoyl Peroxide (ii) Water-soluble amine curing agent [Beckopox 623W/80WA (trademark) made by Hoechst Japan Ltd.]

<Component (C): Binder>

Acrylic resin emulsion [an emulsion containing 44.8% by mass of acrylate ester copolymer and 55% by mass of water, and the balance surfactant; Newcoat KSB-1 (trademark) made by Shin-Nakamura Chemical Co., Ltd.]

<Component (D): Mica>

Mica powder [average particle diameter: 130 µm; flake state; SB-061R (trademark) made by YAMAGUCHI MICA CO., LTD.]

<Comparative Component (D): Mica>

Mica powder [average particle diameter: 180 µm; flake state; B-82 (trademark) made by YAMAGUCHI MICA CO., LTD.]

<Component (E): Inorganic Filler>

(i) Diatomaceous earth [average particle diameter: 5.5 µm; indeterminate form; SNOW FLOSS (trademark) made by Celite Corporation]

(ii) Talc [average particle diameter: 20 µm; indeterminate form; MISTRON VAPOR (trademark) made by Nihon Mistron Co., Ltd.]

<Comparative Component (D): Silica Particle>

Spherical silica powder [average particle diameter: 1 µm or less; AEROSIL 200V (trademark) made by NIPPON AEROSIL CO., LTD.]

<Component (F): Curing Accelerator>

(i) Saccharin (ii) Thiosalicylic acid,

Physical Properties

Each physical property of the Examples and the Comparative Examples was measured as follows.

<Generation Degree of a Shaving>

In measurement of the following adhesive strength (fixing force), a generation degree of a shaving when a precoated bolt was fastened by fastening torque of 30.0 N·m was visually observed and evaluated. Evaluation results are indicated by the following signs.

G: There is no generation of a shaving

B: There is a generation of a shaving

<Applying Property>

Into bolt holes of a panel for dipping a bolt, five bolts (JIS Level 2 M10*20P1. zinc-plated chromate treated hexagon head bolt) in total were inserted. In this state, compositions were applied, namely only screw portions were soaked in compositions of the respective Examples and Comparative Examples shown in Tables 1 and 2 for several minutes, and then pulled up. Next, application liquid stuck to tip portions was removed by soaking only the tip portions of the bolts in water and swinging the bolts together with the panel for several minutes. The application liquid was applied to the screw portion of each bolt by the above operation. The bolts were dried in a thermostatic chamber at 80° C. for 20 minutes to obtain applying property test samples (precoated bolts). Then, applied states of the application liquid on applying property test samples were visually determined to evaluate applying properties. Evaluation results are indicated by the following signs.

G: On all the five bolts, the applied states were good and the application liquid was uniformly applied.

B: On at least one of the five bolts, unevenness in the applied state was observed and the application liquid was not uniformly applied.

<Adhesive Strength (Fixing Force)>

A nut was fastened on the precoated bolt manufactured in the above measurement of applying property, by fastening torque of 30.0 N·m. Next, the composition on the fastened nut and bolt was cured by storing the nut for 24 hours in an environment of atmospheric pressure and temperature: 25±1° C. to obtain an adhesive strength test sample. Breaking torque of the precoated bolt was measured. The breaking torque is torque measured by turning the nut against a fastening direction in a state where the bolt is fixed. In the measurement, the above five precoated bolts were measured to adopt an average value thereof. The breaking torque is the adhesive strength (N m). The zinc-plated chromate treated hexagon head bolts (JIS Level 2 M10*20P1.5) were used for the test, whereas similar zinc-plated chromate treated nuts, which were fit to the hexagon head bolts, were used. Evaluation results are indicated by the following signs.

G: Adhesive strength is 45 N·m or more

M: Adhesive strength is 40 N·m or more but less than 45 N·m

B: Adhesive strength is less than 40 N·m

<Adhesive Strength after Preservation>

A nut was fastened on the precoated bolt manufactured in the above measurement of applying property, by fastening torque of 30.0 N·m. Next, the composition of the fastened nut and bolt was cured by storing the nut for 24 hours in an environment of atmospheric pressure and temperature: 25±1° C. Then, the fastened nut and bolt was stored for 1 month in an environment of atmospheric pressure, temperature: 40±1° C., and relative humidity: 95% to obtain an adhesive strength after preservation test sample. Breaking torque of the precoated bolt was measured. A method for measuring the breaking torque is the same as that for measuring the above adhesive strength (fixing force). In the measurement, the above five precoated bolts were measured to adopt an average value thereof. The breaking torque is the preservability (N·m). The bolts and the nuts used for the test have the same specification as those in the above adhesive strength measurement. Evaluation results are indicated by the following signs.

G: Preservability is 45 N·m or more
M: Preservability is 40 N·m or more but less than 45 N·m
B: Preservability is less than 40 N·m Examples 1 to 3 and Comparative Examples 1 to 7

Preparation of (A) a Microcapsule Encapsulating the Component (a)

100 grams of an isobutylene-maleic anhydride copolymer [Isobam 04 (trademark) made by KURARAY CO., LTD.] and 10.4 grams of sodium hydroxide were added to 625.6 grams of ion-exchange water before agitating at 110° C. for 4 hours in a pressurized container to obtain an aqueous solution with pH of 2.9. Next, after adding 100 grams of the aqueous solution to 270 grams of ion-exchange water, 184.8 grams of the above component (a) (i) the mixture of ethoxylated bisphenol A methacrylate and ethylene glycol dimethacrylate was added before agitating at room temperature to prepare an aqueous dispersion. Then, 110 grams of ion-exchange water and 32.1 grams of a methylol melamine prepolymer [Sumirez Resin 615 (trademark) made by Sumitomo Chemical Co., Ltd.] as a microcapsule wall material were added to the above aqueous dispersion before polycondensating 3 hours while heating to 60° C. and agitating to obtain slurry of the microcapsule. Furthermore, the slurry of the microcapsule was dehydrated in a centrifugal dehydrator before drying to obtain an aggregate of the microcapsule. An average particle diameter of the obtained microcapsules was 150 μm and a content of ethoxylated bisphenol A methacrylate in the microcapsule was approximately 80 mass %.

Preparation of a Microcapsule Encapsulating the Component (B)

(i) Benzoyl peroxide was used as the component (B). After adding 100 grams of polyvinyl alcohol to 200 grams of ion-exchange water, 100 grams of the component (B) the benzoyl peroxide was added before agitating and mixing for 45 minutes. 1 gram of methylol melamine and 10 grams of formaldehyde were added to the mixture before agitating and mixing for 10 minutes. Next, the solution was neutralized with 20% dilute sulfuric acid to obtain slurry of the microcapsule. Then, the slurry of the microcapsule was dehydrated in a centrifugal dehydrator before drying to obtain an aggregate of the microcapsule. An average particle diameter of the obtained microcapsules was 50 μm.

Preparation of the Microcapsule Type Curable Resin Composition

In each of the Examples and the Comparative Examples, each substance shown in Tables 1 and 2 was used by each parts by mass shown in Tables 1 and 2. Remaining components except the microcapsule (A) encapsulating the component (a), the microcapsule encapsulating the component (B), and the component (C) the binder were added to distilled water before agitating under an ambient temperature for 30 minutes until the solution became uniform. After adding the component (C) the binder to the solution while agitating, the microcapsule (A) encapsulating the component (a) and the microcapsule encapsulating the component (B) were added before agitating under an ambient temperature for 30 minutes until the solution became uniform, thereby the microcapsule type curable resin composition was manufactured.

In each of the Examples and the Comparative Examples, the above various physical properties were evaluated using the microcapsule type curable resin composition. The results are shown in Tables 1 and 2. All numerical values in Tables 1 and 2 are indicated in units of parts by mass except the numerical value of the mass ratio (E)/(C).

TABLE 1

| Component | | | Examples | | |
|---|---|---|---|---|---|
| | | | 1 | 2 | 3 |
| (A) | Capsule encapsulating (a) | | 5.00 | 5.00 | 5.00 |
| (a) | Methacrylate mixture*1 | | 4.00 | 4.00 | 4.00 |
| (B) | Capsule encapsulating (B) | | 0.50 | 0.50 | 0.50 |
| | Benzoyl peroxide | | 0.40 | 0.40 | 0.40 |
| (C) | Acrylic resin emulsion | | 1.30 | 1.30 | 1.30 |
| (D) | Mica, Average particle diameter: 130 μm | | 0.58 (10.5)*2 | 0.58 (10.5)*2 | 0.87 (15.8)*2 |
| Comparative (D) | Mica, Average particle diameter: 180 μm | | — | — | — |
| (E) | Diatomaceous earth, Average particle diameter: 5.5 μm | | 0.58 (10.5)*2 | — | 0.29 (5.3)*2 |
| | Talc, Average particle diameter: 20 μm | | — | 0.58 (10.5)*2 | — |
| Comparative (E) | Spherical silica powder, Average particle diameter: 1 μm or less | | — | — | — |
| Mass ratio (E)/(D) | | | 1/1 | 1/1 | 0.33/1 |
| (F) | Thiosalicylic acid | | 0.87 | 0.87 | 0.87 |
| | Saccharin | | 0.19 | 0.19 | 0.19 |
| Solvent | Water | | 4.86 | 4.86 | 4.86 |
| Property | Generation degree of a shaving | | G | G | G |
| | Applying property | | G | G | G |
| | Adhesive strength (Fixing force) | | G | M | M |
| | Adhesive strength after preservation | | G | M | M |

TABLE 2

| Component | | Comparative examples | | | | | | |
|---|---|---|---|---|---|---|---|---|
| | | 1 | 2 | 3 | 4 | 5 | 6 | 7 |
| (A) (a) | Capsule containing (a) | 5.00 | 5.00 | 5.00 | 5.00 | 5.00 | 5.00 | 5.00 |
| | Methacrylate mixture*1 | 4.00 | 4.00 | 4.00 | 4.00 | 4.00 | 4.00 | 4.00 |
| (B) | Capsule containing (B) | 0.50 | 0.50 | 0.50 | 0.50 | 0.50 | 0.50 | 0.50 |
| | Benzoyl peroxide | 0.40 | 0.40 | 0.40 | 0.40 | 0.40 | 0.40 | 0.40 |

TABLE 2-continued

|  | Component | Comparative examples |  |  |  |  |  |  |
|---|---|---|---|---|---|---|---|---|
|  |  | 1 | 2 | 3 | 4 | 5 | 6 | 7 |
| (C) | Acrylic resin emulsion | 1.30 | 1.30 | 1.30 | 1.30 | 1.30 | 1.30 | 1.30 |
| (D) | Mica, Average particle diameter: 130 μm | 1.16 (21.1)*2 | — | 0.29 (5.3)*2 | 0.58 (10.5)*2 | — | — | — |
| Comparative (D) | Mica, Average particle diameter: 180 μm | — | — | — | — | 0.29 (5.3)*2 | 0.58 (10.5)*2 | 0.87 (15.8)*2 |
| (E) | Diatomaceous earth, Average particle diameter 5.5 μm | — | 1.16 (21.1)*2 | 0.87 (15.8)*2 | — | — | — | — |
|  | Talc, Average particle diameter: 20 μm | — | — | — | — | 0.87 (15.8)*2 | 0.58 (10.5)*2 | 0.29 (5.3)*2 |
| Comparative (E) | Spherical silica, powder, Average particle diameter: 1 μm or less | — | — | — | 0.58 (10.5)*2 | — | — | — |
| Mass ratio (E)/(D) |  | 0/1 | 1.16/0 | 3/1 | 1/1 | 3/1 | 1/1 | 0.33/1 |
| (F) | Thiosalicylic acid | 0.87 | 0.87 | 0.87 | 0.87 | 0.87 | 0.87 | 0.87 |
|  | Saccharin | 0.19 | 0.19 | 0.19 | 0.19 | 0.19 | 0.19 | 0.19 |
| Solvent | Water | 4.86 | 4.86 | 4.86 | 4.86 | 4.86 | 4.86 | 4.86 |
| Property | Generation degree of a shaving | G | B | B | B | B | G | G |
|  | Applying properly | B | G | G | B | G | B | B |
|  | Adhesive strength (Fixing force) | M | G | G | M | G | G | M |
|  | Adhesive strength after preservation | B | G | G | B | G | G | M |

*1 The methacrylate mixtures in Tables 1 and 2 are the above component (a) (i) the mixture of ethoxylated bisphenol A methacrylate [NK ester BPE-80N (trademark) made by Shin-Nakamura Chemical Co., Ltd.] and ethylene glycol dimethacrylate [NK ester 1G (trademark) made by Shin-Nakamura Chemical Co., Ltd.] mixed in molar ratio of 9.5:0.5.
*2 The numerical values in the parentheses of the components (D) and (E) in Tables 1 and 2 all indicate an amount (parts by mass) of each component per total 100 parts by mass of all of the microcapsules contained in the composition.

Example 4 and Comparative Example 8

Preparation of (A) a Microcapsule Encapsulating the Component (a)

The preparation was carried out in the same way as the above Examples except that the component (a) was substituted by (ii) the mixture of bisphenol A type epoxy resin, bisphenol F type epoxy resin and neodecanoic acid glycidyl ester. An average particle diameter of the obtained microcapsules was 150 μm and a content of ethoxylated bisphenol A methacrylate in the microcapsule was 80% by mass.

Preparation of the Microcapsule Type Curable Resin Composition

In each of the Example and the Comparative Example, each substance shown in Table 3 was used by each parts by mass shown in Table 3. Preparation of the microcapsule type curable resin composition was carried out in the same way as the above Examples.

In each of the Example 4 and the Comparative Example 8, the above various physical properties were evaluated using the microcapsule type curable resin composition. The results are shown in Table 3. All numerical values in Table 3 are indicated in units of parts by mass except the numerical value of the mass ratio (E)/(C). Furthermore, a difference in generation degrees of a shaving between the Example 4 and the Comparative Example 8 is shown in FIG. 1.

TABLE 3

|  | Component | Example 4 | Comparative example 8 |
|---|---|---|---|
| (A) | Capsule encapsulating (a) | 5.00 | 5.00 |
| (a) | Epoxy resin mixture*3 | 4.00 | 4.00 |
| (B) | Water-soluble amine curing agent | 3.00 | 3.00 |
| (C) | Acrylic resin emulsion | 1.50 | 1.50 |
| (D) | Mica, Average particle diameter: 130 μm | 0.60 (12.0)*2 | — |

TABLE 3-continued

| Component | | Example 4 | Comparative example 8 |
|---|---|---|---|
| (E) | Diatomaceous earth, Average particle diameter: 5.5 μm | 0.60 (12.0)*2 | 0.60 (12.0)*2 |
| Mass ratio (E)/(D) | | 1/1 | 0.6/0 |
| Solvent | Water | 5.00 | 5.00 |
| Property | Generation degee of a shaving | G | B |
| | Applying property | G | B |
| | Adhesive strength (Fixing force) | G | M |
| | Adhesive strength after preservation | G | M |

*2: The numerical values in the parentheses of the components (D) and (E) in Table 3 all indicate an amount (parts by mass) of each component per total 100 parts by mass of all of the microcapsules contained in the composition.
*3: The epoxy resin mixture in Table 3 is the above component (a) (ii) the mixture of bisphenol A type epoxy resin [jER828 (trademark) made by Mitsubishi Chemical Corporation], bisphenol F type epoxy resin [jER807 (trademark) made by Mitsubishi Chemical Corporation] and neodecanoic acid glycidyl ester [Cardura E10P (trademark) made by Momentive Specialty Chemicals Inc.] mixed in molar ratio of 4.5:4.5:1.0.

In the Examples 1 to 3, the mass ratio of (D) mica having an average particle diameter of 10 to 150 μm and (E) an inorganic filler having an average particle diameter of 3 to 50 μm, and the kind of the component (E) were varied within the present invention. In the Example 2, the component (E) the diatomaceous earth having an average particle diameter of 5.5 μm in the Example 1 was substituted by the talc having an average particle diameter of 20 μm. Although the adhesive strength (fixing force) and the adhesive strength after preservation were slightly reduced, the effects of the present invention were not prevented. Furthermore, in the Example 3, the mass ratio (E)/(D) was varied from 1/1 in the Example 1 to 0.33/1. Although the adhesive strength (fixing force) and the adhesive strength after preservation were slightly reduced, the effects of the present invention were not prevented.

On the other hand, in the Comparative Example 1, instead that (E) the diatomaceous earth having an average particle diameter of 5.5 μm in the Example 1 was not contained, (D) the mica having an average particle diameter of 130 μm was added by the equivalent amount of 0.58 parts by mass. Although generation of a shaving was not observed, the applying property and the adhesive strength after preservation got considerably worse. In the Comparative Example 2, instead that (D) the mica having an average particle diameter of 130 μm in the Example 1 was not contained, (E) the diatomaceous earth having an average particle diameter of 5.5 μm was added by the equivalent amount of 0.58 parts by mass. Generation of massive shavings was observed. In the Comparative Example 3, the component (E) was blended beyond the range according to the present invention. Generation of massive shavings was observed similar to the Comparative Example 2. In the Comparative Example 4, the average particle diameter of the component (E) the inorganic filler was below the range according to the present invention. Generation of massive shavings was observed, and the applying property and the adhesive strength after preservation got considerably worse. In the Comparative Example 5, the average particle diameter of the component (D) the mica was beyond the range according to the present invention, and the component (E) was blended beyond the range according to the present invention. Generation of massive shavings was observed. In the Comparative Example 6, the average particle diameter of the component (D) the mica was beyond the range according to the present invention in comparison with the Example 1. Although generation of a shaving was not observed, the applying property got considerably worse. In the Comparative Example 7, the average particle diameter of the component (D) the mica was beyond the range according to the present invention, and the blending amount of the component (E) was decreased in comparison with the Comparative Example 6 within the range according to the present invention. The applying property got considerably worse, and the adhesive strength (fixing force) and the adhesive strength after preservation were slightly reduced.

In the Example 4, the epoxy resin was used as the curable compound (a). The properties of the obtained microcapsule type curable resin composition were considerably good. On the other hand, in the Comparative Example 8, (D) the mica was not blended in comparison with the Example 4. Generation of massive shavings was observed, and the applying property also got considerably worse. Furthermore, reductions in the adhesive strength (fixing force) and the adhesive strength after preservation were also observed. It is observed that, in the microcapsule type curable resin composition of the Comparative Example 8, the generation of a shaving and the applying property got considerably worse, as shown in FIG. 1.

INDUSTRIAL APPLICABILITY

The microcapsule type curable resin composition according to the present invention has excellent adhesive strength and is characterized in that a shaving is hardly generated when the composition is applied to an adherend, for example a threaded member, for fastening and in that uneven application is not generated due to the excellent applying property of the composition to the adherend. Particularly, since a shaving is hardly generated, the composition is expected to be used for electronic components, for example a sliding part of the electronic components, precision components, and the like.

EXPLANATION OF REFERENCE 1 microcapsule type curable resin composition layer after application
2 shaving

The invention claimed is:
1. A microcapsule type curable resin composition containing:
(A) a microcapsule encapsulating a curable compound (a);
(B) a substance able to bring about curing of the component (a); and
(C) a binder able to adhere the microcapsule to an adherend,
characterized in that the microcapsule type curable resin composition includes, per total 100 parts by mass of all of the microcapsules, (D) 1 to 25 parts by mass of mica having an average particle diameter of 10 to 150 μm, and (E) 1 to 25 parts by mass of an inorganic filler (except the mica) having an average particle diameter of 3 to 50 μm, a mass ratio of the component (D) and the component (E) being 0.2 to 2.0 of the component (E) with respect to 1.0 of the component (D).
2. The microcapsule type curable resin composition according to claim 1, wherein the component (E) is selected from the group consisting of diatomaceous earth, talc and silica.
3. The microcapsule type curable resin composition according to claim 1, wherein the average particle diameter of the component (D) is 100 to 150 μm.

4. The microcapsule type curable resin composition according to claim 1, wherein the average particle diameter of the component (E) is 5 to 30 µm.

5. The microcapsule type curable resin composition according to claim 1, wherein the component (D) is in a flake state.

6. The microcapsule type curable resin composition according to claim 1, wherein the mass ratio of the component (D) and the component (E) is 0.3 to 1.5 of the component (E) with respect to 1.0 of the component (D).

7. The microcapsule type curable resin composition according to claim 1, wherein the component (a) is one or more kinds selected from the group consisting of a (meth) acrylate compound and an epoxy compound.

8. The microcapsule type curable resin composition according to claim 1, wherein an average particle diameter of the component (A) is 50 to 500 µm.

9. The microcapsule type curable resin composition according to claim 1, wherein the adherend is a threaded member.

* * * * *